W. A. PATTON.
CHECK.
APPLICATION FILED JUNE 28, 1919.

1,367,754.

Patented Feb. 8, 1921.

UNITED STATES PATENT OFFICE.

WILLIAM A. PATTON, OF SAN FRANCISCO, CALIFORNIA.

CHECK.

1,367,754.　　　　Specification of Letters Patent.　　Patented Feb. 8, 1921.

Application filed June 28, 1919. Serial No. 307,400.

*To all whom it may concern:*

Be it known that I, WILLIAM A. PATTON, a citizen of the United States, residing at San Francisco, in the county of San Francisco and State of California, have invented certain new and useful Improvements in Checks, of which the following is a specification.

My present invention relates to those instruments used in commerce between the drawer and payee for drawing on and payment from funds of the drawer, such as checks and receipts.

In commerce payment for services rendered as by an employer to an employee is usually made in one of two ways—either by cash or by check. The check system has its advantages, from a business standpoint over that of payment by cash in that with the payment by cash or coin considerable clerical work is necessary to complete the pay roll promptly, at the end of a week or other period; much time is consumed in obtaining the necessary notes and coins of proper denominations for each individual employee and assorting the same; and there is danger of robbery where a large sum of money is on hand, as at industrial plants, but the check system has those disadvantages in that employees object to the payment by check in that there is often considerable delay in getting them cashed at the banks where it is usual to secure from the employer signature cards of the employees and compare the employees' signatures as indorsements on the checks with the signatures on the cards before cashing the checks.

One of the principal objects of my invention is therefore to provide an instrument in the nature of a check, in that it is a draft or order on a bank or banker, and susceptible of use in lieu of the signature card in that it provides for ready and convenient means of identification for the payee without the labor and expense of making out signature cards, mailing them to the bank and of locating signature cards at the bank when the instrument is presented for payment.

Another object of my invention is to provide an instrument of the character described which provides spaces for at least two signatures of the payee so arranged that the person indorsing the instrument as the payee may be required to subscribe his signature thereto without having the first signature in his line of vision, but which instrument may be quickly folded to subsequently dispose both signatures for minute comparison, each to that extent where the portion of the paper bearing one signature may be folded longitudinally of the signature for comparison of the strokes or general spacing or disposition of the letters making up the signature as is sometimes practised by experts in handwriting to detect genuine or fraudulent signatures.

Other objects and advantages of the invention will appear in the following detailed description taken in connection with the accompanying drawing, forming a part of this specification and in which drawing:

Figure 1 is a view of the front of an instrument, such as a check embodying my invention.

Fig. 2 is a view of the back thereof.

Fig. 3 is a view of the folded instrument disclosing a portion of the front and a portion of the back of the check as held in the left hand of a person for comparison of signatures.

In the drawings, where similar characters refer to similar parts throughout the views, 3 designates the body portion of the instrument which is preferably elongated in shape, similar to that of an ordinary check. On the face of the check is provided the usual space 4 for signature or other identification means of the drawer, delineated or defined in any suitable manner; the name of the drawee 5 delineated in any suitable manner; space 6 for the name of the payee; indicated by delineations in any suitable manner, and such other indicia as is necessary to complete or provide space for the entry of matter to render the instrument a draft or order on a bank or banker in the usual manner. There is also provided on the face of the check a space 7 designated for the signature of the payee and which may be associated with a receipt form 8 delineated on the face of the check. It is preferred to dispose this space 7 transversely of the check at the right end portion of the face thereof, for a purpose to be subsequently set forth.

The back of the check is provided with a space 9 designated for the signature of the payee as an indorsement and it is preferred to provide this space at the usual left-hand portion of the check transversely thereof.

The check may also carry an indicator 10 for indicating the line on which the check may be folded in order to dispose the spaces 7 and 9 one above the other as clearly shown in Fig. 3 of the drawings.

When bringing this instrument into use, the check portion is completed in the usual manner, the name of the payee at the space 6. The payee is required to place his signature at the space 7 in the presence of paymaster or other person, thus securing the signature known to be genuine.

The indorsement must occur on the back of the check in the usual manner and the payee may be required to place his signature thereon in the presence of the paying teller, without having the first-mentioned signature in the line of vision after which the check may be folded on substantially the line indicated by indicators 10 and the two signatures will then be one above the other for minute comparison. Of course, the check may be further folded to bring the two signatures closer together for a more accurate comparison of the various strokes and characteristics of the several letters.

I claim:

A check of the character described comprising a sheet having appropriate spaces thereon to receive the amount, name of the payee and signature of the maker of the check, a legend at one end of the obverse face of the check written cross-wise thereof and being in substance a receipt of the amount of the check, said legend having a space beneath same for the signature of the payee at the time of issue of the check to the latter, said sheet having on its reverse face a space for indorsement by the payee at the time of cashing the check, said sheet also provided with notches made intermediate its ends and transversely thereof to indicate a line of bending of the check and to facilitate such bending, said notches being located with respect to the signature spaces on both obverse and reverse faces of the check whereby when folded the payee's signatures will be placed one above another in position for quick and accurate comparison.

WILLIAM A. PATTON.